Sept. 10, 1963  J. T. FRASER  3,103,620
DIRECTION SENSOR

Filed April 9, 1959  9 Sheets-Sheet 1

INVENTOR.
JULIUS T. FRASER

BY
ATTORNEY.

Sept. 10, 1963  J. T. FRASER  3,103,620
DIRECTION SENSOR

Filed April 9, 1959  9 Sheets-Sheet 2

INVENTOR.
JULIUS T. FRASER
BY
ATTORNEY.

Sept. 10, 1963  J. T. FRASER  3,103,620
DIRECTION SENSOR
Filed April 9, 1959  9 Sheets-Sheet 4
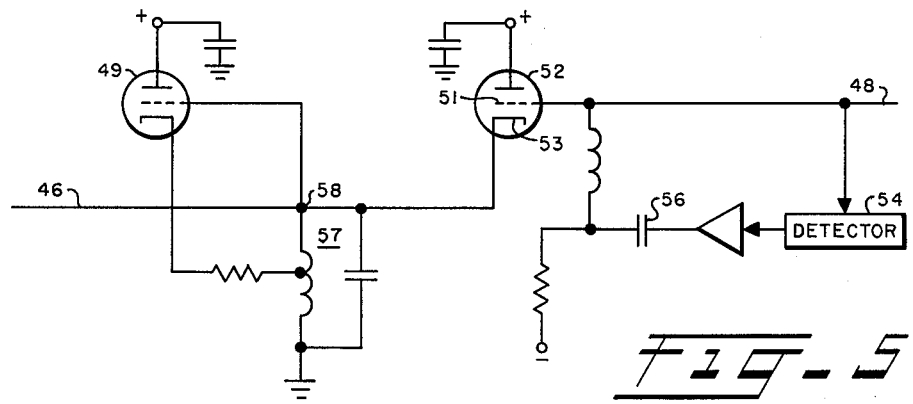
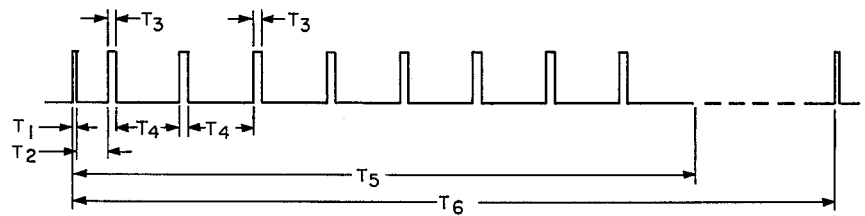
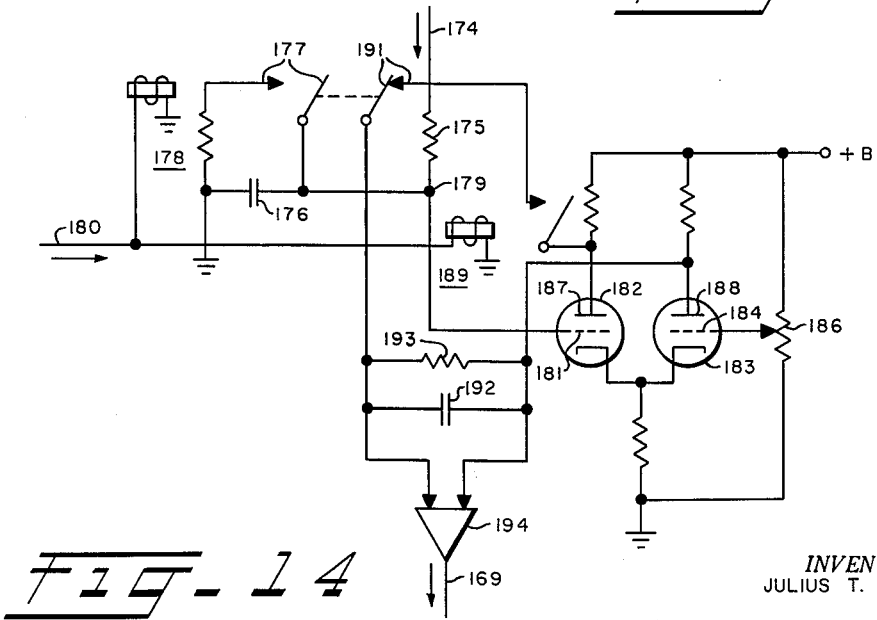
*INVENTOR.*
JULIUS T. FRASER
BY
*ATTORNEY.*

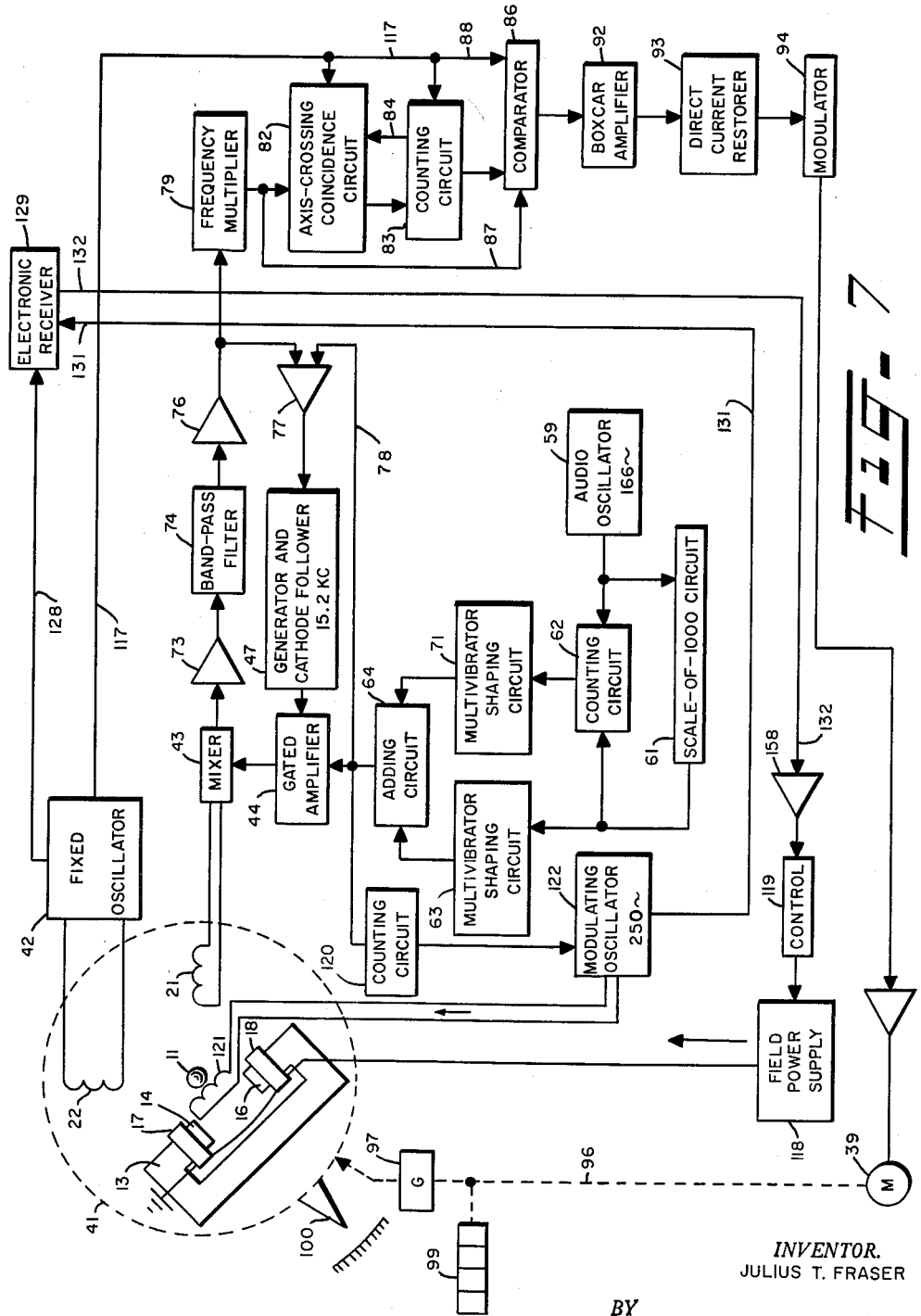

INVENTOR.
JULIUS T. FRASER

ATTORNEY.

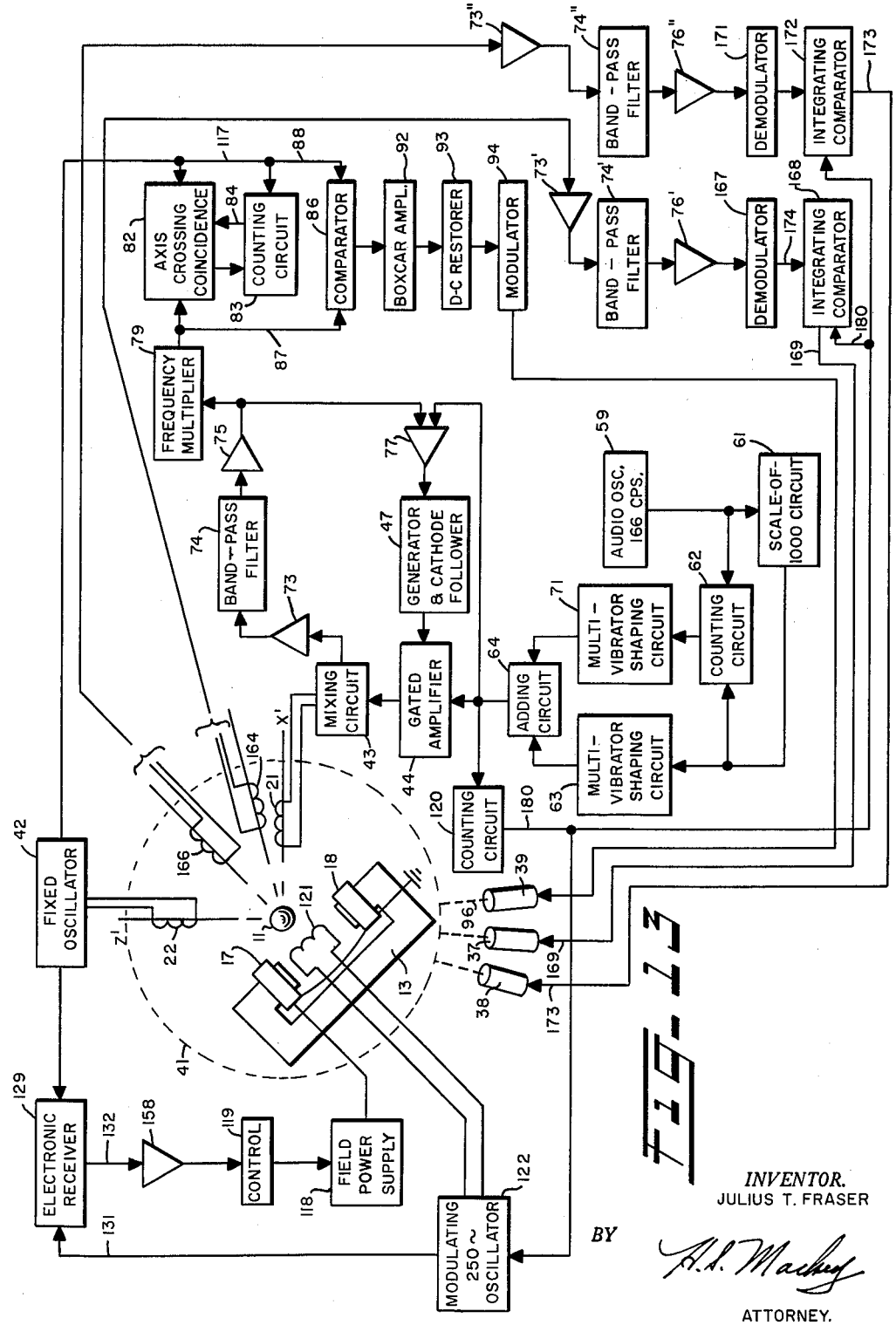

United States Patent Office 3,103,620
Patented Sept. 10, 1963

3,103,620
DIRECTION SENSOR
Julius T. Fraser, Pleasantville, N.Y., assignor to General Precision, Inc., a corporation of Delaware
Filed Apr. 9, 1959, Ser. No. 805,338
13 Claims. (Cl. 324—.5)

This invention relates to devices for sensing direction relative to an inertial or sidereal frame.

The device of this invention may be said to depend, for its operation, on the property of rigidity in space, similar to that of a free gyroscope. However, unlike the free gyroscope, this device has little or no drift or accumulated error in its direction indications. This virtue is obtained by basing the operation of the invention on the properties of subatomic particles.

The invention employs the properties of two subatomic entities, the nucleus and the electron, but it is only the macroscopic properties of the nucleus which enter directly into the determination of direction. Any species of nucleus may be employed having angular momentum, manifesting a magnetic moment, and susceptible to the Overhauser effect. By Overhauser effect is meant the phenomenon described by A. W. Overhauser in the Physical Review, vol. 92, on page 411. In this phenomenon, during the pick-up by induction of signals from nuclei after excitation at their Larmor frequency, if associated electrons also be excited at their electron Larmor frequency the nuclear signal is greatly increased in amplitude. The nucleus and the electron may be those of the same kind of atom or of two different kinds of atoms. As example, the nucleus of the common isotope of hydrogen may be employed. The hydrogen may be in any form; in chemical combination as in water or in a solid, of as the free elemental gas. The electron may be the unpaired electron found in the manganous ion, which is preferably in the form of a water solution of a salt such as manganous sulphate. Any other molecule having an unpaired electron exhibiting the phenomenon of electron resonance may be employed. The physical nature and material of the bottle, bottles or other containers containing the subatomic particle substances is unimportant so long as the material is nonmagnetic, does not react with the substance, and does not exhibit magnetic resonance in the region of interest. The aggregate protons and the aggregate electrons should be in such form as to be immersed in and equally acted upon by a constant-direction magnetic field which is to be described, and the materials containing them must be intimately mixed when the Overhauser effect is employed.

The nucleus of an atom of common hydrogen, $H^1$, consisting of a single proton, is considered to be in rapid spinning rotation and therefore has mechanical properties like those of a rapidly rotating gyroscope. Like the gyroscope, its axis of rotation will move in a circle, or precess, if a torque be applied to it. Such a moment is supplied if the proton be subjected to a magnetic field, and the rate of precession, $\omega_p$, is $$\omega_p = \gamma_p H \tag{1}$$

in which $\gamma_p$ is a constant of nature termed the gyromagnetic ratio or the magneto gyric ratio, and is known with accuracy. H is the strength of the magnetic field. The rate of precession, $\omega_p$, is termed the Larmor frequency.

Similarly, all electrons are in a spinning rotation and undergo precessional rotation when subjected to the force of an external magnetic field. Under certain conditions the precessional rate of electrons in certain environments can be observed and measured, just as that of nuclei can be measured. The Larmor frequency, $\omega_e$, of the electron is $$\omega_e = \gamma_e H \tag{2}$$

in which $\gamma_e$ is a constant of nature which is known with accuracy and H is the magnetic field strength.

The applicant has determined that the free precessional rotations of the nucleus have the property of rigidity in space. If therefore, the instrument containing the particles, say proton particles, itself has a rotation relative to the inertial frame in a plane perpendicular to the axis of precession, the instrumental rotation, $\omega$, is added to or subtracted from the Larmor rate. That is to say, the apparent Larmor frequency is varied by an amount which is dependent on the rate of instrument rotation. Equation 1 is modified in Equation 3 to take account of this and the resulting apparent Larmor rate, $\omega_p'$, is that which would be observed by an observer rotating with the instrument.

$$\omega_p' = \gamma_p H + \omega \tag{3}$$

Thus, rotation of the instrument relative to inertial space can be detected and measured but, of course, translatory motion is not detected.

When the particle is a proton, Equation 3 applies. In the case of free precession of any other particle, an equation similar to Equation 3 applies. In the case of slaved precession, that is, when large-angle precession is effected by the continuous application of an alternating magnetic field of substantially Larmor frequency the particle still has the property of gyroscopic rigidity in space. However, an equation of the simple form of (3) is not adequate. In the case in which the particle is an electron the situation is quite complicated but is generally described by $$\omega_e' = \gamma_e H + F(\omega_e, \omega, P) \tag{4}$$

in which $\omega_e'$ is the Larmor frequency which an observer rotating with the instrument would see. The term ($\gamma_e H$) is inserted separately to show the explicit dependence of $\omega_e'$ on it in the first degree. P stands for all other parameters among which are H, and T, the relaxation time of the electron. For the purpose of this description, when the electron's precessional frequency is not employed directly in the computation of $\omega$, but merely in a convenient method of controlling the continuous magnetic field, Equation 4 may be approximated as $$\omega_e' \cong \gamma_e H \tag{5}$$

and this approximation may be employed as correct enough in this use.

One way in which a precessing particle may be coerced by an external force is by application of a constant-direction magnetic field. If an aggregate of particles be subjected to a steady magnetic field, after a time depending on the nature of the particles, they all will have been coerced to positions in which their axes of precession are all either parallel or antiparallel to the magnetic field, there being a preponderance in one direction causing a net macroscopic magnetic moment. The above equations contain the tacit assumption that this has been done, that the direction of the field H is that of the macroscopic indication of the direction of the common axis of precession, and that the plane of instrumental rotation, $\omega$, is perpendicular to the field H.

Such a gradual alignment or realignment of the aggregate precessional axis of a number of freely precessing particles to the direction of a constant field is termed relaxation. The relaxation times of interest in this invention may be small or large depending on many factors.

The particles also can be coerced by an oscillating magnetic field and, if the frequency of oscillation be correct, the oscillating field will change the angle of precession.

If the direction of an incident constant-direction magnetic field be changed, the particle precessional axes will gradually realign themselves to the new direction. While they are doing so, the precessional motion can be detected and the detected signal will have an amplitude varying with axial direction and with time. The amplitude of this detected signal is a measure of the amount of rate of axial displacement and can be employed, together with the before-described frequency determination in accordance with Equation 3, for the complete determination in three dimensions of the direction of pointing of the field direction relative to an inertial frame.

One purpose of this invention is to provide means employing subatomic particle rotation for finding direction.

Another purpose of this invention is to provide means employing nuclear rotations for finding direction relative to an inertial frame.

Another purpose of this invention is to provide an instrument employing signals secured from the free precession of nuclei, aided in instrumentation by the slaved precession of electrons, to produce signals representative of direction in inertial space.

Another purpose is to secure direction information qualitatively similar to that secured from conventional gyroscopes, and to secure this information by monitoring certain changes which take place within the molecular structure of matter when the matter is rotated relative to inertial space axes.

Another purpose is, by employing and monitoring the Larmor precessional frequency of atomic nuclei, to secure absolute directional indications free from most of the limitations of conventional gyroscopes such as drift, and from the necessity of employing rotating physical components.

A further understanding of this invention may be secured from the detailed description and associated drawings, in which:

FIGURE 5 illustrates a form of oscillator for use with the invention.

FIGURE 6 is a timing graph illustrating the sequence of pulses.

FIGURE 7 is a schematic diagram depicting, in addition to the apparatus of FIG. 4, components for detecting, measuring and utilizing the electron Larmor precessional frequency to maintain constancy of the constant-sense magnetic field.

FIGURE 13 is a schematic diagram showing circuitry added to that of FIG. 7 to detect and measure instrument rotations in all three dimensions of space.

FIGURE 14 is a schematic diagram of the integrator employed in FIG. 13.

Figure 1:
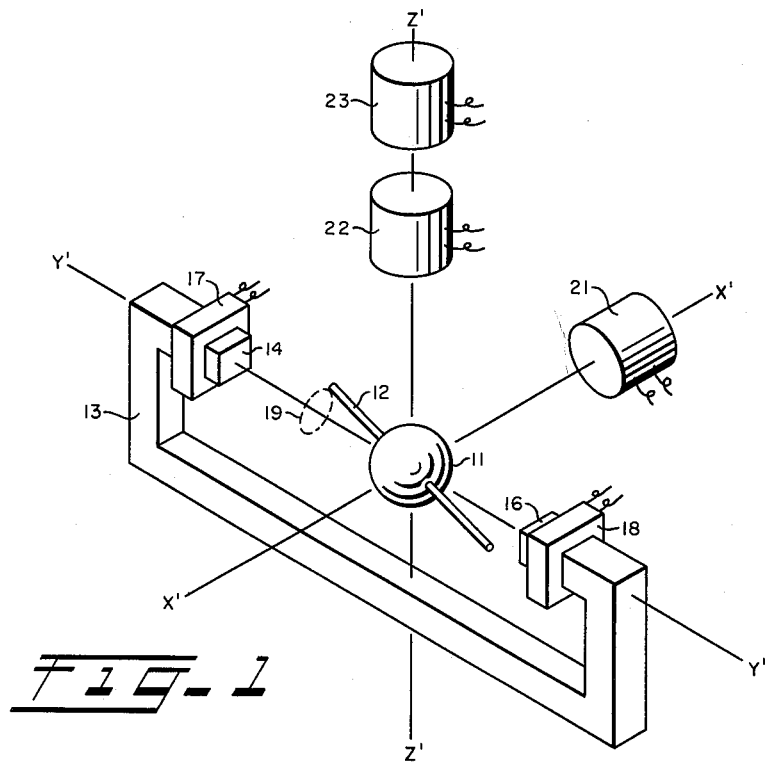
FIGURES 1 and 10 are schematic representations of the subatomic particles employed in this invention together with a field magnet and coils for pulsing the particles and for other purposes.

Referring now to FIG. 1, the sphere 11 is a fanciful representation of a spinning proton. Its axes of rotational momentum and of magnetic moment are coincident and are represented by the axle 12. A constant magnetic field is generated by a permanent magnet 13 in the direction Y'—Y'. The permanent magnet 13 is provided with soft iron pole pieces 14 and 16 on which are mounted two coils 17 and 18. By means of these coils the magnetic field produced by the permanent magnet between its poles can be increased or decreased in strength.

When a proton is subjected to a constant magnetic field it precesses, the axis of precession being in the direction of the field. Therefore the proton representation 11 precesses due to the field of magnet 13, and this precession is indicated by the circle 19, although the angle of precession is normally very small and is greatly exaggerated in the figure.

When an alternating field at right angles to the constant field is additionally applied to the proton, as for example, by a coil 21 energized from an oscillator, and when the oscillator frequency is equal to the Larmor frequency of proton precession, the precession angle which the axle 12 makes with the Y'-axis increases. If a pulse of alternating field of just the right length be applied the precession angle is brought to 90°. Upon termination of the pulse of alternating field the precession angle again diminishes or relaxes toward zero, the time constant of this relaxation being of the order of seconds or even minutes. During this relaxation period, connection of coil 21 to detection apparatus permits pickup by magnetic induction of that component of the proton's processing field which is parallel to the axis X'—X'. The Larmor frequency is given by Equation 1 if the mutually perpendicular X', Y' and Z' axes are fixed in inertial space. This is the general procedure by which the Larmor frequency of a freely spinning and precessing proton is conventionally measured except that the fixing of the axes in inertial space is neglected. After measurement, when the precessing angle has become small and the received signal correspondingly small, the proton may again be pulsed and the measurement repeated.

The duration of the relaxation period and the consequent time available for obtaining measurements is greatly diminished by even small inhomogeneities in the constant-direction field. However, by the use of any of several techniques the effect of inhomogeneities is largely neutralized. One of the best of these techniques, and the one here employed as an example, is the spin echo technique described by E. L. Hahn in the Physical Review, vol. 80, No. 4, of November 15, 1950, on pages 580–594. This technique involves following the alternating field pulse, after a period, by another alternating field pulse of double length, then after a period of double length, by another pulse of double length. A series of such double-length pulses can be used.

The Overhauser effect can be employed to secure a greatly amplified output signal. To secure this effect, a material is employed containing not only protons, but also unpaired electrons. For present purposes, let it be assumed that the sphere 11 in FIG. 1 represents a small amount of water containing hydrogen in combination, and that manganous sulphate is dissolved in the water. This chemical substance contains unpaired electrons which exhibit electron resonance and and absorption. Additionally the substance employed, and all other materials within the field of magnet 13, should contain no components having precessional frequencies likely to interfere with the measurements which are to be made. A coil 22 is provided coaxial with the Z' axis and therefore at right angles to coil 21 and magnetically decoupled therefrom. The coil 22 is energized from an oscillator having the frequency $\omega_e$, thus continuously exciting electrons at position 11. As a result, the proton resonance signal picked up by coil 21 may be increased many times in amplitude.

The coil 22, excited by alternating current of the electron Larmor frequency $\omega_e$, may have the further function of producing slaved electron resonance and absorption which may be detected and employed to control the strength of the constant-direction field. Exact control of this field is necessary for the highest accuracy. The continuous forced electron precession may be detected by its inductive effect on a pickup coil or, as is more usual, by its absorption of energy from the oscillator exciting coil 22.

The proton Larmor frequencies may range from a few kilocycles to a number of megacycles per second. The electron Larmor frequencies are in the megacycle or kilomegacycle range. The coils depicted in FIG. 1 are therefore schematic only; when microwave frequencies are involved the coil is merely representative of a microwave facility such as a waveguide component, microwave demodulator or a resonant chamber. The locations, also are merely schematic. For example, the application of a magnetic field at microwave frequencies, to the electron-containing material would generally involve placing the material in a microwave-excited resonant chamber, in accordance with current standard techniques.

Figure 2:
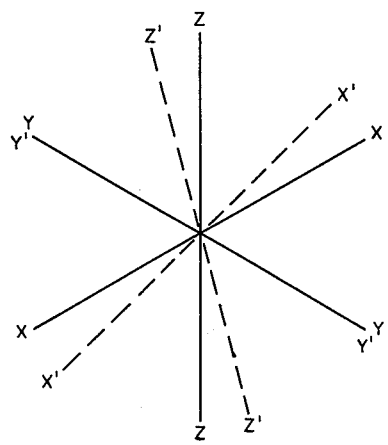
FIGURES 2 and 12 depict the relations between inertial axes and instrument axes.

It is stated above that, with the coil 21 connected to detection apparatus, during relaxation of the proton an alternating current can be detected. This current is induced in the coil by the relaxing protons and is at the Larmor frequency of proton precession, with the instrumental rotation rate in the X'Z' plane added. For convenience, let the instrumental Y'-axis be stationary in space and let the instrument have a rotation in its X'Z' plane relative to inertial space axes. This is depicted in FIG. 2, in which the space axes X, Y, Z, are fixed relative to the fixed stars. The instrumental Y'-axis is coincident with the space Y-axis. The instrumental X' and Z' axes are shown displaced from the space X and Z axes and are imagined as having a rate of rotation relative thereto.

Returning to FIG. 1, if the proton model 11 be completely decoupled from its instrumental environment its precessional rotation ($\omega_p$) relative to space axes is constant and independent of any rotation which the instrument may have. But detection apparatus such as coil 21 or coil 23 in the X'Z' plane, being in rotation with the instrument, will observe the algebraic sum of the proton rotation $\omega_p$ and the instrumental rotation $\omega$. This is stated by Equation 3. The detection and measurement of this instrumental rotation in the X'Z' plane forms one part of the present invention.

It is possible to detect departure of the axis Y' from parallelism with axis Y and to secure signals representing such departure, the means of detection to be described later. These signals can be employed to indicate the rate of motion or angle of the Y' axis relative to the Y axis or to servo the instrument Y' axis into parallelism with the space axis Y. This raises the instrument to the category of a direction finder indicating direction in three dimensions relative to an inertial frame.

Figure 3:
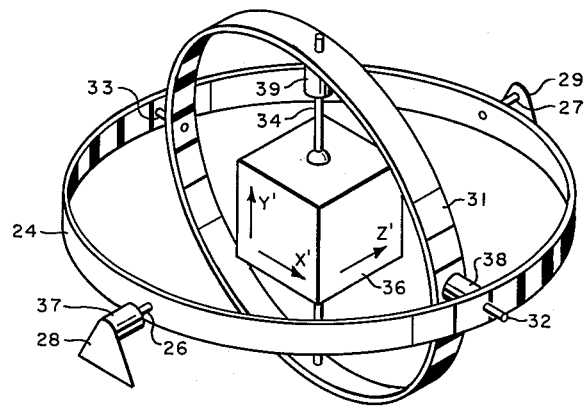
FIGURE 3 illustrates a gimbal mounting for an embodiment of the invention.

In describing apparatus to measure rotation about the Y'-axis, let it be supposed that the components of FIG. 1 are supported in a gimbal such as is shown in FIG. 3. The outer gimbal ring 24 is supported through trunnions 26 and 27 and brackets 28 and 29. The inner gimbal ring 31 is rotatably supported through trunnions 32 and 33 by the outer ring 24. The inner ring 31 carries a shaft 34 which rotatably supports a box 36. This box or platform 36 contains the apparatus of this invention, for example, the components of FIG. 1.

The three orthogonal instrument axes X', Y' and Z' of FIG. 1 are fixed in the box 36, FIG. 3, with the Y'-axis pointing in the direction of the shaft 34.

In order to restrict the box 36 to one degree of rotational freedom relative to the stars, assume that the Y'-axis is caused to remain pointing at a selected point relative to the fixed stars, and term this direction the Y-axis of space. By any method let rotation be imparted to the outer ring 24 relative to the supports 28 and 29 by means of a motor 37, and let rotation be imparted to the inner ring 31 relative to the outer ring by means of a motor 38, these motors driving the rings at such rates that Y' and Y remain coincident. The only instrument rotation relative to space which is then possible is in the X'Z' plane as shown by FIG. 2.

If the supports 28 and 29 be fixed to the surface of the earth, as an illustration, the Y'-axis may be positioned to point toward the north star and the motions imparted to the ring bearings by the motors 37 and 38 may be generated in ways conventional in the design of astronomical telescope supports. It is not necessary, however, to secure the instrument to the surface of the earth. The above description is merely illustrative, and the invention is operative anywhere.

By means of the invention the amount of rotation of the box 36 and its attached components in its X'Z' plane, about its Y'-axis, can be measured. If desired the motion can be fed back, by means of a third motor 39 for rotating shaft 34 relative to the frame 31, so as to stop the rotation of the box about the space axis Y relative to the fixed sidereal axes X, Y, and Z.

Figure 4:
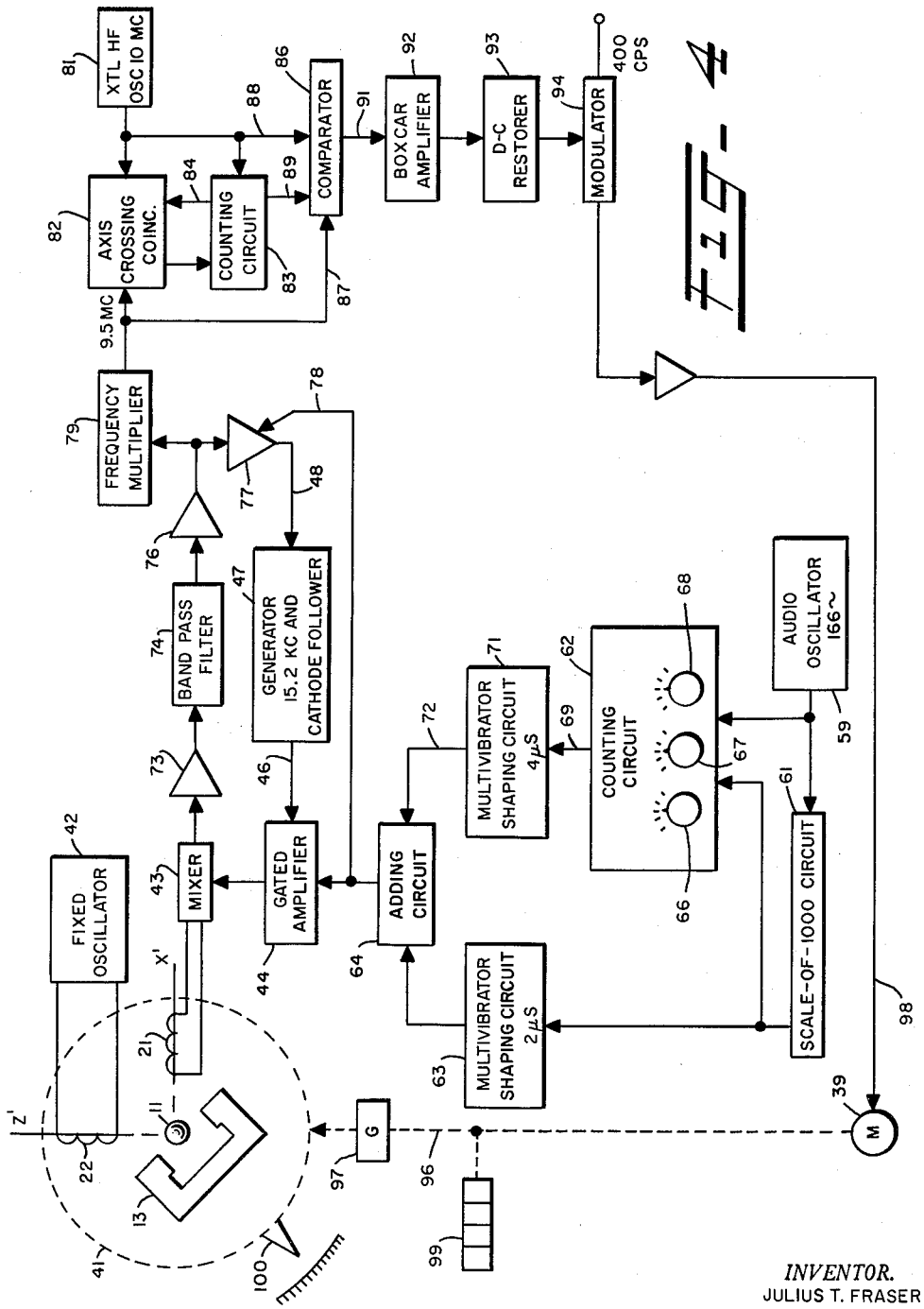
FIGURE 4 is a block and schematic diagram illustrating one form of the invention.

FIG. 4 depicts a circuit for accomplishing this result. The aggregate 11 containing protons and electrons, the permanent magnet 13, and the coils 21 and 22 are those shown in FIG. 1 and are arranged along the mutually perpendicular axes X', Y' and Z' as shown in FIG. 1. In FIG. 4 the X' and Z' axes are shown. The Y'-axis is therefore perpendicular to the paper and the field of the permanent magnet 13 through the aggregate 11 is in the Y'-axis direction, although represented in two dimensions, for convenience, in the drawing. The ring 41 represents rotation of the components and of the aggregate container, being in this special case restricted to rotation about the Y'-axis.

It is desirable to employ a weak constant-direction field magnitude H so that, as shown by Equation 3, the frequency $\omega$ to be measured is a larger fraction of the apparent Larmor proton frequency $\omega_p$, thus improving the accuracy of measurement. This field is provided by the permanent magnet 13.

The Overhauser effect is produced by connecting the coil 22 to a fixed-frequency oscillator 42. The frequency $\omega_e'$ of this oscillator must be maintained at such a value that in accordance with Equation 5 the desired value H will be secured. As a specific example, using the accepted value for $\gamma_e$, if a field of 3.59 oersteds is required, the frequency of oscillator 42 must be 10 mc. p.s. A similar computation, using this field strength, gives a proton Larmor frequency of 15.2 kc. p.s.

The coil 21 is connected to a mixing or adding circuit 43, but in place of this mixing circuit 43 a conventional duplexing or hybrid circuit may be employed if desired. The mixing circuit may consist merely of conductors joined conductively or by capacitors. The mixing circuit 43 is connected to the output of a gated amplifier 44. The amplifier 44 input is connected through a conductor 46 to the output of a generator 47 which, when oscillating freely, generates an output having the above-stated proton Larmor frequency of exactly 15.2 kc. p.s. The generator 47 additionally is capable of being controlled in phase by a signal of substantially the same frequency applied through a conductor 48.

The circuit of this generator is described in U.S. Patent No. 2,856,530 and is shown schematically in FIG. 5 herewith. In the absence of a signal on conductor 48, triode 49 and its circuit oscillates at 15.2 kc. p.s and emits its output energy at conductor 46. The grid 51 of triode 52 is negative relative to its associated cathode 53 during most of the oscillating cycle. When, however, alternating potential of a frequency closely approximating 15.2 kc. p.s. is applied to conductor 48, it is detected in detector 54, amplified and applied through large capacitor 56 to bias the grid 51 positively. This causes the internal resistance of triode 52 to decrease and, as it shunts the tank circuit 57, the oscillations of triode 49 are terminated. Triode 52 now serves as a cathode follower, transmitting the alternating potential impressed on conductor 48 to the tank terminal 58. When the alternating potential on conductor 48 decays to zero, the high internal impedance of triode 52 is restored and the oscillations of triode 49 recommence but, because of the potential last impressed on tank terminal 58 by the signal from conductor 48, the restarted oscillations are in exact phase with the alternating potential which was on conductor 48.

The gated amplifier 44, FIG. 4, is gated by pulses received from a pulse-generating circuit so that during pulses it transmits and amplifies the output of generator 47 while at all other times it is non-transmissive. The pulse-generating circuit contains an audio oscillator 59 emitting rectangular pulses at a frequency of 166 c.p.s. These pulses are counted in a scale-of-1000 circuit 61, emitting a pulse every 1000 cycles. These pulses emitted at a rate of about one every six seconds are applied to a counting circuit 62 and to a multivibrator circuit 63. The latter, when pulsed, emits a pulse which has a specific amplitude and a duration of about two microseconds. This latter pulse is transmitted through an adding circuit 64, the output pulses of which cause the gated amplifier 44 to conduct and amplify. This adding circuit may, for example, conventionally consist of a resistor adding network followed by an amplifier.

The counting circuit 62 also receives the output of oscillator 59, and contains three adjustments 66, 67 and 68 by which circuit 62 emits pulses on conductor 69 at three different selected intervals. The circuit counting is initiated by the pulse from the scale-of-1000 circuit 61. At a time thereafter adjusted by knob 66, which in this example is 58 cycles, the first pulse is emitted on conductor 69. At regular periods thereafter as set by knob 67, in this example 116 cycles, additional pulses are emitted. Termination of the operation at a selected number of cycles, in this example 875 cycles, is set by knob 68.

All pulses on conductor 69 trigger a multivibrator circuit 71 which emits pulses of the same specific amplitude as those from circuit 63 but with a length of about four microseconds. These pulses are applied through conductor 72 and adding circuit 64 to cause amplifier 44 to conduct and amplify for the 4 μs. pulse periods.

The proton-signal-receiving circuit comprises coil 21, mixer 43, amplifier 73, band-pass filter 74 and amplifier 76. The amplifier 76 output is power-amplified in amplifier 77 and applied through conductor 48 to oscillator 47. An inhibiting input of amplifier 77 is connected through a conductor 78 to the output of adding circuit 64, so that during pulses the amplifier 77 is non-conductive. Amplifier 76 output is also applied to a frequency multiplier 79 multiplying its frequency by 625. A ten mc. p.s. crystal-controlled oscillator 81 is connected to an axis-crossing coincidence circuit 82, as is the output of multiplier 79. In place of oscillator 81 an additional output can be taken from oscillator 42 since oscillator 81 has or may have the same frequency. However, two oscillators are shown to emphasize their disparate functions. Coincidence circuit 82 emits a single pulse when the axis crossing of its two inputs are coincident. This pulse is used to start accounting circuit 83 which receives input from circuit 81 and counts $5 \times 10^6$ cycles of circuit 81 output. During this time, through conductor 84, circuit 83 inhibits the output of circuit 82. A phase comparator 86 receives two inputs on conductors 87 and 88 from circuits 79 and 81. The phase comparator 86 also has a start pulse input at conductor 89 from the counting circuit 83, receiving this start pulse when the counting circuit completes its count. The comparator 86, when pulsed, subtracts the instantaneous amplitudes of its input signals on conductors 87 and 88 and emits a signal on conductor 91 representative of this difference. This signal amplitude is a sine function of the phase difference at that instant of the signals on the conductors 87 and 88.

The single pulse on conductor 91 is repeated at the cyclic rate of counter 83, which is once each one-half second. The pulse train consisting of these pulses is applied to an integrating amplifier 92, preferably on the kind termed a boxcar amplifier, which converts the pulse train into a direct potential varying in steps representative of the pulse amplitudes. The direct voltage lever is adjusted in a direct-current restorer 93, and converted into alternating current by a modulator 94 having a 400 c.p.s. power supply and frequency reference. The output is amplified and applied to operate a two-phase motor 39 rotating the components shown within circle 41 through shaft 96 and reducing gear 97.

It is to be noted that the signal applied to motor 39 through conductor 98 represents a rate, as does the motor shaft 96 speed, but that the shaft 96 position or angular deflection represents the integral of its speed. The motor 39 can therefore be considered to be an integrator.

In the operation of the circuit of FIG. 4, spin echo techniques are employed to neutralize inhomogeneities of the constant magnetic field produced by magnet 13. A single rectangular pulse of alternating magnetic field is applied by means of coil 21 to the proton aggregate 11 in a direction at right angles to the constant-direction field of the permanent magnet. The alternating field must have the frequency $\omega_p$, or so nearly this frequency as to excite the protons. In this example the frequency is 15.2 kc. p.s. The duration of the pulse, $T_1$, must be that which effectively turns the macroscopic precession angle through 90°. The termination of this 90° pulse is effected by making the amplifier 44 non-transmissive. This "off" period has a duration of $T_2$. A second pulse is then applied having a duration $T_3$, which is termed a 180° pulse, and which effectively turns the macroscopic precession angle through 180°. This pulse is twice the period $T_1$ in length and is followed by a gated-off period $T_4$ which is twice the period $T_2$. A total of eight 180° pulses are applied, followed by a quiescent gated-off period of at least 40 milliseconds. After the end of the quiescent period the entire cycle is repeated. This time division is graphically indicated in FIG. 6. The pulse amplitudes, lengths and separations are dependent on the physical requirements. In this example the alternating field strength is 20 oersteds and the duration $T_1$ and $T_3$ of the 90° and 180° pulses are about 2 and 4 microseconds respectively. Assuming a signal-to-noise ratio of 100, and because of the use of spin echo technique and of the Overhauser effect, the duration $T_5$ of usable received signal will be almost six seconds and the entire process time, $T_6$, can be made, for example, about six seconds. If the scale-of-1000 counter 61 is arranged to control this process and to repeat it after 1000 cycles, then the frequency of oscillator 59 can be 166 cycles per second.

In FIG. 6 the rectangular pulses are drawn disproportionately wide for clarity, and the durations employed in this example are $T_1 \cong 2$ μs.
$T_2 = 58$ cycles $\cong 350$ ms.
$T_3 \cong 4$ μs.
$T_4 = 116$ cycles $\cong 700$ ms.
$T_5 = 875$ cycles $\cong 5.25$ seconds
$T_6 = 1000$ cycles $\cong 6.0$ seconds The graph of FIG. 6 depicts the series of nine pulses applied to the proton aggregate 11, FIG. 4, from the generator 47. During the time period $T_5$, FIG. 6, excluding the pulse periods signals are induced by the relaxing protons in the coil 21, FIG. 4, at the frequency $\omega_p$ of nuclear Larmor precession modified, so far as the signal reception in the instrument frame of reference is concerned, by whatever motion the instrument has relative to inertial space in the XZ plane, this modified frequency being termed $\omega_p'$. It is desired to secure a measure of this frequency $\omega_p'$ and employ it to servo the components within the circle 41 so that they are stationary in the inertial XYZ frame.

During relaxation the X'—X' component of the macroscopic proton precession field induces signals in coil 21. These signals induced in coil 21 are amplified in amplifier 73, filtered to remove noise in filter 74, and again amplified in amplifier 76. They are then applied through power amplifier 77 and conductor 48 to generator 47. Although these received signals diminish with time, they persist for each period $T_4$ with enough intensity to inhibit the generator 47 and to cause it to serve merely as a cathode follower. These signals thus are present in generator 47 at the beginning of each 180° pulse, which therefore is forced to start in phase. These coherent 180° pulses are applied through amplifier 44 to coil 21 and constitute spin echo pulses.

At the forward edges of the 2 µs. and 4 µs. pulses the amplifier 77 is inhibited to insure instant and positive starting of the generator 47.

The received signals are also applied to multiplier 79 where their frequency is multiplied by 625. When the received signal frequency, $\omega_p'$ is exactly that of the generator 47, 15.2 kc. p.s., the output frequency of multiplier 79 is exactly 9.5 mc. p.s. If, however, because of rotation of the instrument in the inertial frame at a rate $\omega$, the received signal frequency, $\omega_p'$, differs from the proton Larmor frequency, $\omega_p$, in accordance with Equations 1 and 3 combined as $$\omega_p' = \omega_p + \omega \quad (6)$$

then the output frequency of multiplier 79 differs from 9.5 mc. p.s. by a corresponding amount.

The signal output of multiplier 79 is applied to coincidence circuit 82 together with the signal from the stable 10 mc. p.s. oscillator 81. When the axis crossings from these two sources coincide, the circuit 82 emits a signal starting the counting circuit 83. This circuit counts the 10 mc. p.s. pulses of oscillator 81 and emits a pulse every $5 \times 10^6$ cycles, or every half second. Circuit 83 then rests until it receives another pulse from circuit 82 indicating coincident axis crossings, when it again counts $5 \times 10^6$ cycles and emits a pulse, and continues in this manner.

The comparator 86 receives signals from oscillator 81 through conductor 88 and from multiplier 79 through conductor 87, and compares their phases at the instant when it is pulsed through conductor 89. If the frequency in conductor 87 is exactly 9.5 mc. p.s., this input will be at zero phase, as will the input at conductor 88 also, since the periods of the 9.5 mc. p.s. and 10 mc. p.s. inputs are each exactly divisible into ½ second. In this case the comparator 86 emits no output signal on conductor 91. If, however, the frequency at input 87 be slightly greater than 9.5 mc. p.s., the phase of this input at the ½ second time from start of counting circuit 83 will not be zero and a signal of a certain amplitude and sense representative of the phase difference will be emitted on conductor 91. If the frequency at input 87 be slightly less than 9.5 mc. p.s. there will again be a signal emitted at conductor 91, but of the opposite sense. Thus the signal at conductor 91 represents in both amplitude and sense the term $\omega_{in}$ Equation 6. The change of phase perceived by comparator 86 will be small, and in no case can be larger than 180° during the ½ second period of the counting circuit 83. The output in conductor 91 is converted by integrator 92, restorer 93, modulator 94 and motor 39 to a shaft rate representing by its speed and sense the departure of the pulse amplitude difference in conductor 91 from the mean datum value representing the 9.5 mc. p.s. frequency, and therefore representative of the relative phase of $\omega_p'$. The motor 39 servos the components within circle 41 to null the difference to the mean datum value, thus keeping the X'Z' axes, FIG. 2, immobile relative to the XZ axes.

A counter 99 on shaft 96 or a pointer 100 and index connected to the components 41 will indicate the absolute instrument frame position.

As was stated, for the highest accuracy the constant-direction field must be controlled to a degree of accuracy no less than the accuracy required in the output. This is obvious from Equation 3 in which $\omega$ and H are both of the first degree.

FIG. 7 depicts components for accomplishing this control by use of the precessional frequency of the electron. Manganous sulphate is a suitable compound containing an unpaired electron, the precession of which can be influenced and measured. Since the proton precession is also to be influenced and measured in the way described in connection with FIG. 4, the manganous sulphate is dissolved in water, which contains $H^1$, providing the proton supply. This also provides the intimate association of unpaired electrons and protons necessary for utilization of the Overhauser effect. The manganous sulphate solution position is indicated in FIG. 7 at 11.

In FIG. 7 the following components are identical with components depicted in FIGS. 1 and 4 and previously described as components and in operation: magnet core 13 with coils 17 and 18, coil 21, mixer 43, gated amplifier 44, 15.2 kc. p.s. generator 47, amplifier 73, band-pass filter 74, amplifier 76, adding circuit 64, multivibrator shaping circuits 63 and 71, counting circuit 62, scale-of-1000 circuit 61, and audio oscillator 59 having a frequency of 166 c.p.s.

Also the proton receiving circuit and feedback control circuit are the same, consisting of frequency multiplying circuit 79, coincidence circuit 82, counting circuit 83, comparator 86, boxcar amplifier 92, D.-C. restorer 93, modulator 94, motor 39, counter 99, pointer 100, and shaft 96.

In place of the crystal oscillator 81, FIG. 4, used as a clock or time reference in measuring proton precessional motion phase shift, the oscillator 42, FIG. 7, is employed. This oscillator must be accurately controlled to operate at a fixed and invariable frequency. It may be crystal controlled or its frequency may be determined by the resonant frequency of an inductance-capacitance tank circuit. In FIG. 7 the latter method is selected and the fixed frequency of oscillation is 10 mc. p.s.

Figure 8:
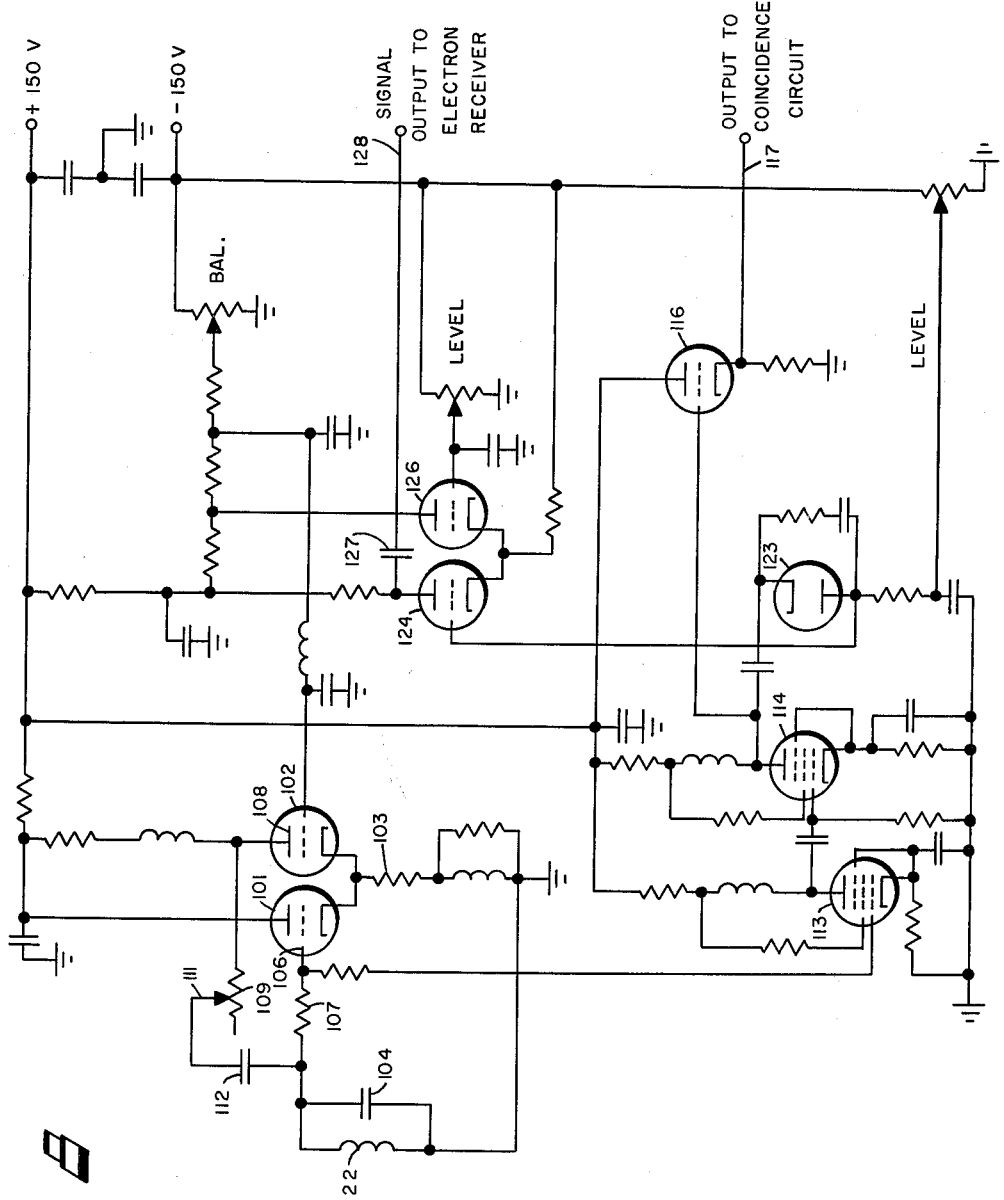
FIGURE 8 is a schematic diagram of the fixed-frequency oscillator of FIG. 7.

A suitable circuit for oscillator 42 is given in FIG. 8. Two triodes 101 and 102 have a common cathode resistance 103. A tank circuit resonant at the oscillator frequency consisting of inductance 22 and capacitance 104 is connected to grid 106 through a decoupling resistor 107, the other end of the tank circuit being grounded. A regenerative feedback path is provided from anode 108 through potentiometer 109, which is adjustable by slider 111 to control feedback, and coupling capacitor 112 to the circuit of control grid 106. Output is taken from grid 106 through two pentode amplifiers 113 and 114 and a cathode follower 116. The output conductor 117 is connected to the axis-crossing coincidence circuit 82, FIG. 7.

The constant-direction field applied to the nuclear and electronic aggregate 11 is provided by a permanent magnet 13 having soft iron pole pieces 14 and 16 and with coil windings 17 and 18 thereon, as described in connection with FIG. 1. However, alternatively, the magnetic circuit may contain soft iron and no permanent magnet, and all of the magnetomotive force may be provided by an electromagnet winding and by the coils 17 and 18, FIG. 7. These coils are connected in series and are energized from a field power supply 118, the strength and sense of energization being controlled by a control circuit 119. The magnetic axis through aggregate 11, the axis of coil 21 and that of coil 22 are mutually at right angles.

The absorption method is employed to detect electron resonance and the phase-shift method is employed, using a 250 cycles per second amplitude modulating frequency, to secure an error signal. This signal is employed to control the strength of the constant-direction field.

The constant-direction field of magnet 13 is amplitude modulated at a rate of 250 c.p.s. by a small coil 121 having its axis in line with the constant-direction magnetic field direction through the aggregate. The coil 121 is driven from a modulating oscillator 122 having the output frequency of 250 c.p.s. The field amplitude excursion is a small fraction, say a few percent, of the constant-direction field strength at the aggregate. The excursion is of course about the constant-direction field strength which, as an example, is selected to be 3.59 oersteds as in the first embodiment.

A counting circuit 120 is triggered from the output of the adding circuit 64, and emits a gate which permits the modulating oscillator 122 to oscillate only during the quiescent or moment-forming part of the pulse cycle. In the cycle values selected, this quiescent part succeeds the eighth 4-μs. pulse and terminates at the end of the period $T_6$, and is approximately 0.75 second long. The purpose of this gating is to prevent the 250 c.p.s. oscillations from being received by mixer 43, amplifier 73 and following components, where this modulation might interfere with the very precise counting and comparing operation of comparator 86.

The output of pentode amplifier 114, FIG. 8, is demodulated in diode 123, circuit constants being such that most of the 10 mc. p.s. frequency is removed but the 250 c.p.s. frequency is not removed. The diode output is amplified and its level adjusted at triodes 124 and 126, and the signal output is delivered to the electronic receiver through capacitor 127 and conductor 128.

The electronic receiver 129, FIG. 7, contains amplifiers, a 250 c.p.s. band-pass filter, and a phase detector. Phase reference is secured from the modulating oscillator 122 through conductor 131. The output of the electronic receiver 129 consists of a direct-current error signal in conductor 132 representing in amplitude and sense the difference in frequency of the oscillator 42 and the electron precession frequency.

Figure 9:
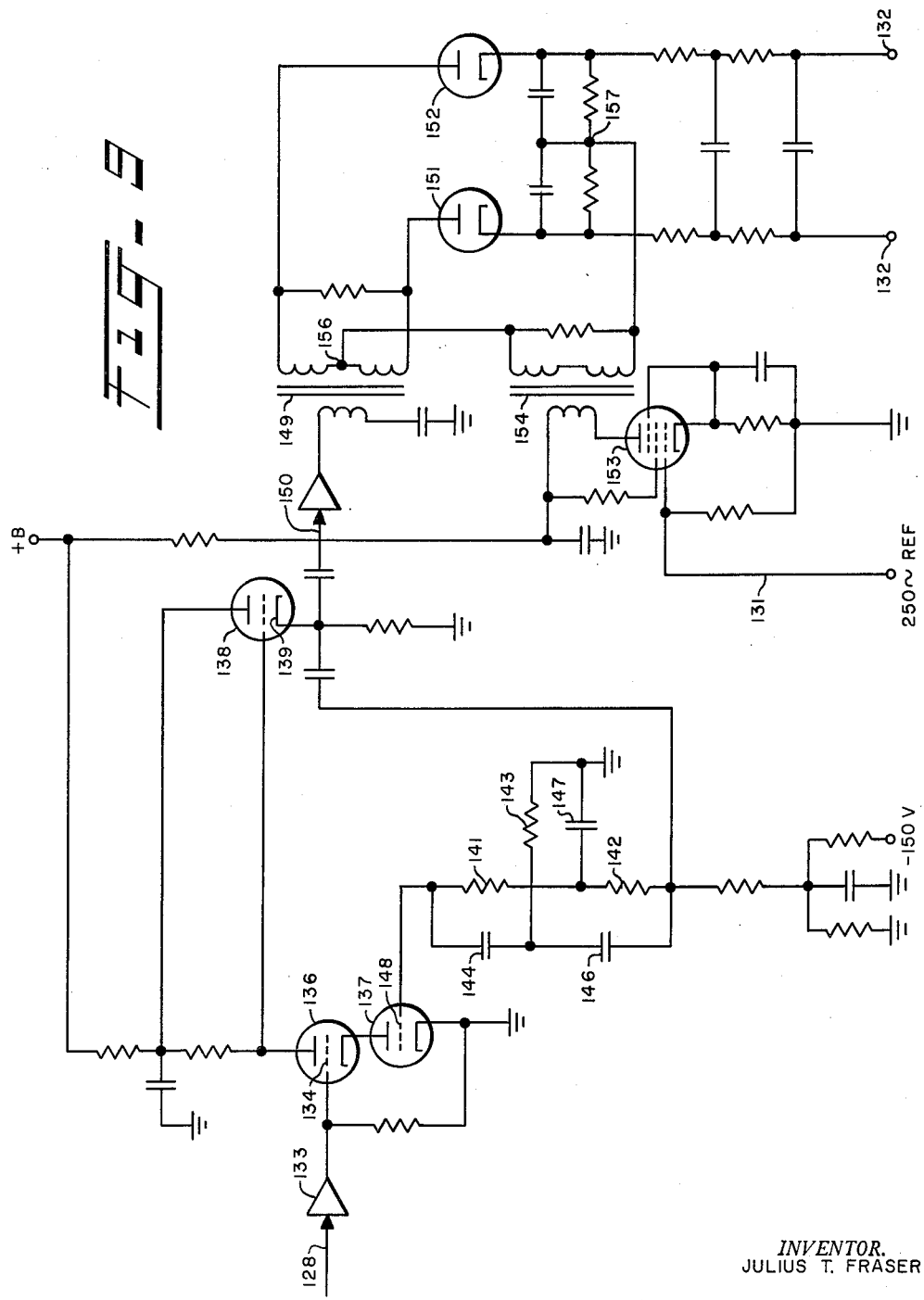
FIGURE 9 is a schematic diagram of the electronic receiver of FIG. 7.

The circuit of electronic receiver 129 is depicted in FIG. 9. The input signal received on conductor 128 is amplified in amplifier 133 and applied to the control grid 134 of a modulator comprising triodes 136 and 137. The output is applied to a cathode follower 138. A negative feedback path is provided from the cathode 139 of triode 138 through a parallel-T rejection circuit, consisting of resistors 141, 142 and 143 and capacitors 144, 146 and 147, to the grid 148 of triode 137. Output of the circuit is taken from cathode 139 through conductor 150. The rejection circuit feedback path is tuned to 250 c.p.s. This entire circuit from input 128 to output 150 operates as a band-pass amplifier peaked for maximum transmission at 250 c.p.s.

The output is amplified and applied to a phase detector including a transformer 149 followed by two diodes 151 and 152 and filter elements terminating in output conductors 132. Reference phase is secured from the modulating oscillator 122, FIG. 7, through conductor 131, FIGS. 7 and 9. This reference signal is amplified in pentode amplifier 153 and applied to a transformer 154 having its secondary winding connected between transformer center tap 156 and rectifier output center tap 157. Thus the continuous output potential between conductors 132 has amplitude and polarity representing the amount and sense of phase difference between the 250 c.p.s. signal component at the input conductor 128 and the reference signal at conductor 131.

This output signal is applied from conductor 132, FIG. 7, to a direct-coupled amplifier 158 and the amplified signal is employed, through control circuit 119, to control the output amplitude of power supply 118. This output energizes electromagnet coils 17 and 18 to increase or decrease the field generated by magnet 13 in such direction as to neutralize fortuitous variations.

In the operation of the circuit of FIG. 7, the sweeping of the magnetic field strength through a range by modulating coil 121 causes the electron Larmor resonance frequency to be varied through the 10 mc. p.s. frequency of oscillator 42. This varies the load on the oscillator resulting in a potential variation at the grid 106, FIG. 8, at the 250 c.p.s. rate. This potential variation is demodulated in diode 123 and, in the receiver of FIG. 9, is phase detected to secure at conductors 132 a direct-current error signal representing the frequency difference between the electron Larmor frequency and 10 mc. p.s. This depends on the fact that, when the electron Larmor frequency passes through the 10 mc. p.s. oscillator frequency, the 250 c.p.s. phase changes by 180°. This error signal is employed, through control 119 and power supply 118, to adjust the magnetic field strength of the magnet 13 so that the electronic Larmor frequency is maintained precisely at 10 mc. p.s. In doing so, the field strength is periodically corrected so that variations extending over a time period in excess of the period $T_6$ are removed. Thus any variability of magnetic field strength is substantially removed from consideration in solving Equation 4 for the instrument frame rotational rate ω.

If three complete instruments as depicted in FIG. 7 be provided, complete determination of direction in three-dimensional space can be achieved. In one of these instruments the direction of the constant-sense magnetic field may be at first thought of as fixed in some first sidereal direction, as described in accordance with FIG. 7. In the other instruments the directions of the constant-sense field are fixed at right angles to the first field direction and to each other. If this orthogonal relation be preserved the first field need not be fixed relative to sidereal space and its rotation relative to the first sidereal direction can be ascertained. Thus, by the combination of the three outputs, the complete determination of direction relative to inertial space is achieved. Obviously, three completely separate instruments are not necessary, for some components can be common to the three.

Three-dimensional rotation can be sensed in another way, employing the components of FIG. 1. This method depends on the fact that, if in FIG. 4 or 7 the magnetic field direction should not be fixed in space, but should change in its sidereal direction after the protons have been pulsed, while they are relaxing and while their relaxation signals are being received, these received signals will be diminished in magnitude.

Figure 10:
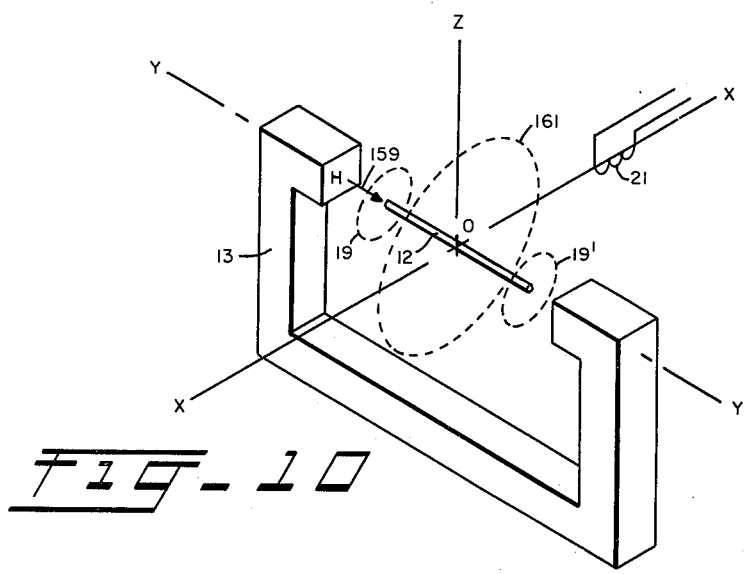

To explain this method, the arrangement of FIG. 1 is in part depicted in FIG. 10. A constant field of magnitude H is generated by the magnet 13 in the Y-axis direction of inertial space. The net magnetization due to the protons is schematically shown by a bar magnet 12 pointing in the field direction 159. When precessing about the origin O, the bar magnet's ends describe circles 19 and 19', with the axis of precession pointing in the field direction 159. A pulse of alternating current at Larmor frequency passed through coil 21, the pulse having the right length and amplitude, causes the precession half-cone angle to become 90° so that the magnet 12 may be imagined as rotating about O in the XZ plane with its ends describing the circle 161. After the pulse the proton relaxes until its precessional or half-cone angle again becomes nearly zero, returning to approximately the position drawn.

Figure 11:
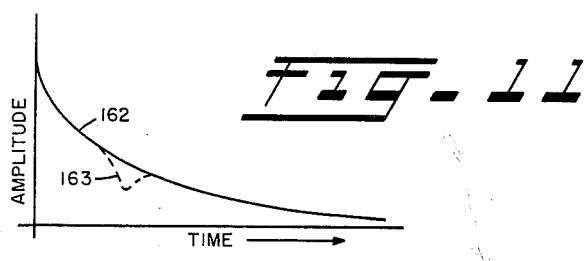
FIGURE 11 is a graph showing the decay of the nuclear relaxation signal with time and its reduction due to rotation of the instrument.

During relaxation the proton precessional signal amplitude induced in coil 21 decreases exponentially from a maximum, when the proton is rotating in the XZ plane, to substantially zero when the proton bar magnet is pointing in direction 159, as depicted by curve 162, FIG. 11.

Figure 12:
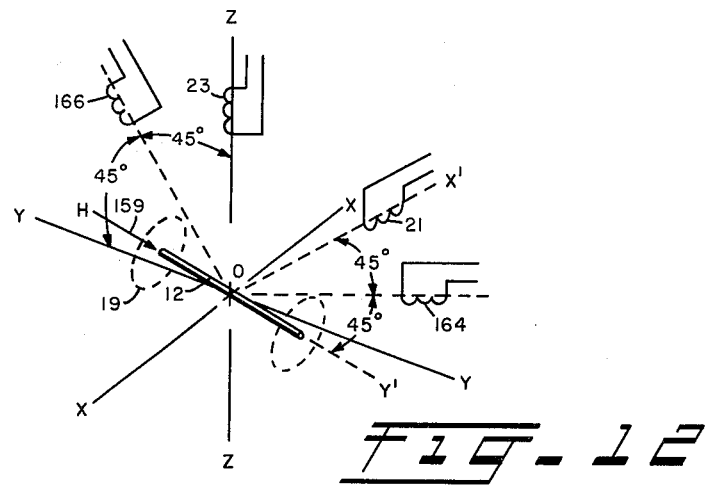

Let it now be assumed that, during relaxation, the X and Y axes move, in the XY plane, by a small amount relative to the field direction 159. Since, however, the X and Y axes represent sidereal axes, it is more logical to call them fixed, as they are, and to assume the motion of the entire instrument about the Z-axis so that the field direction, 159, rotates through a small angle in the XY plane. The coil 21 also rotates by the same small angle. This shift is indicated in FIG. 12 by the small angles between the X and X' axes, and between the Y and Y' axes.

It is remembered that the coil 21 picks up the component of the rotation 19 of a nuclear pole which is parallel to the axis of coil 21. Therefore, when such a relative shift of the coil 21 takes place, while the proton still precesses about the inertial Y-axis direction, the shift reduces the strength of the proton signal picked up by the coil. This may be visualized as a drop 163 of the amplitude represented by curve 162, FIG. 11. This shift of the field H also applies a torque to the proton, tending to cause it to modify its precessional pattern and after a time to precess about the new position of the field direction 159.

Now, instead of supposing a relative shift of the Y-axis and the H-direction in the XY plane, assume such a relative shift but in the YZ plane. A similar drop in the signal amplitude received by coil 23 is caused, followed by gradual reorientation of the precessional axis to realignment with the H-directional 159 in the YZ plane, and by recovery of the signal amplitude to its exponential curve 162 value.

Thus the coils 21 and 23 receive signals which have magnitudes dependent on shifts in the XY and YZ planes, respectively. However, the directions or signs of these shifts cannot be sensed by coils 21 and 23. In the X'Y' plane, for example, a shift of the X'-axis by a selected angle in either direction from the X-axis will cause an equal drop, such as the drop 163, FIG. 11, in the signal amplitude. In order to sense the direction of the axial shift, the sensing coil must be moved away from the position of coil 21, keeping in the X'Y' plane. Optimum sense indication is secured when the coil is moved approximately 45° from the position shown for coil 21. As an example, a coil 164 is depicted at this 45° angle. This coil will detect a shift of the sense depicted as a momentary drop in signal intensity, but will detect a shift of the opposite sense as a momentary increase in signal intensity. For the same reason the best position of a coil for sensing shifts in Y'Z' plane is shown by coil 166 at an angle of 45° to coil 23 in the Y'Z' plane.

A circuit for instrumentation to detect, measure, indicate, and feed back these two amplitude signals is schematically indicated in FIG. 13. The circle 41 represents rotation or rotatability of the components shown therein in any direction. The field H of the structure 13 is in the Y' direction, considered to be perpendicular to the paper. The components within the enclosure 41 include the proton and electron material 11, the magnet 13, coil 21 and coil 22, in the relations shown in FIG. 1 and as described in connection therewith. All components shown in FIG. 7 are retained and numbered as in FIG. 7. The coils 164 and 166 of FIG. 12 are shown, their angular relations being those depicted in FIG. 12.

Components added to detect amplitude changes in the XY plane, FIG. 12, are shown in FIG. 13 connected to coil 164. They include an amplifier 73', band-pass filter 74' and amplifier 76' similar to the unprimed components 73, 74 and 76. They are followed by a demodulator 167 and integrator 168. The integrator 168 output constitutes an error signal which is fed back through conductor 169 to torquing motor 37, shown in FIG. 3 as the outer gimbal ring torquing motor.

The components for measuring motion in the Y'Z' plane are connected to coil 166, including amplifier 73", band-pass filter 74" and amplifier 76", all similar to components 73', 74' and 76'. The output of amplifier 76" is demodulated in demodulator 171 and integrated in integrator 172. The output is fed back through conductor 173 to torquing motor 38, shown in FIG. 3 as the inner gimbal ring motor.

The circuit of the similar integrators 168 and 172 is shown in FIG. 14. The demodulated input signal, such as that represented at 163, FIG. 11, is fed through conductor 174 to an integrator consisting of resistor 175 and capacitor 176. The capacitor 176 is shunted by the normally-open contacts 177 of a slow-operate, slow-release relay 178 operated from the counting circuit 120, FIG. 7, through conductor 180. The integrator output terminal 179, FIG. 14, is connected to the grid 181 of a difference amplifier comprising triodes 182 and 183. The grid 184 thereof is connected to an adjustable source of direct current represented by the potentiometer 186. The amplified difference output is taken from anodes 187 and 188, through the forward contact of slow-release relay 189, also operated from counting circuit 120, and the back contacts 191 of relay 178, to a storage capacitor 192. This capacitor is shunted by a high resistance resistor 193 to provide a discharge having a time constant which is much longer than six seconds. The capacitor 192 is connected to the high impedance input of an amplifier 194. Its output conductor 169 is connected to the torquing motor 37, FIG. 13.

In the operation of the circuit of FIG. 14, during the period $T_5$, FIG. 6, the relays 178 and 189 are unoperated and the capacitor 176 accumulates a charge. At the end of period $T_5$, the counting circuit 120 gate energizes relays 178 and 189, but relay 178 delays closing until near the end of the quiescent period. Relay 189 closes immediately, and the charge on capacitor 176 is applied to grid 181. The amplified difference between this potential and the reference potential on grid 184 appears across capacitor 192, the charge of which is augmented or reduced thereby, for the applied potential may be of either sense. Near the end of the period $T_6$ the relay 178 operates, opening its contacts 191 to discontinue charging the storage relay 192, and closing contacts 177 to discharge capacitor 176. Thus the partly smoothed potential on conductor 169 represents the amount by which the curve 163, FIG. 3, represented by the input signal applied to resistor 174, differs from the curve 162, represented by the setting of potentiometer 186.

The operaton of the circuit of FIG. 13 can be applied in any environment, in space as well as on the surface of the earth, to determine absolute direction in the three coordinates of space. By means of the circuit of FIG. 4, the proton Larmor frequency is detected as well as apparent changes therein caused by rotations of the instrument in a selected direction of inertial space, and an error signal is developed representing these changes in frequency. This error signal is then fed back to a servomechanism by which the instrument support is servoed to nullify this rotation. By means of the circuit of FIG. 13, rotation in the two other orthogonal directions of inertial space are detected and error signals representing these rotations relative to inertial space are developed. These error signals are fed back to servomechanisms connected to the gimbal support system, so that these rotations relative to the other two directions of inertial space are nullified.

Thus the direction 159, FIG. 10, of the constant-sense field becomes an indicator which is maintained pointing in a selected spatial direction. The action of this device is therefore that of a free gyroscope of conventional design except that the instant device has no drift within limits of the looseness of coupling of the readout components to the proton particle precessional rotations.

What is claimed is:

1. A direction sensor comprising, a body of material containing nuclei of atoms, means for applying a unidirectional magnetic field to said body of material, means for applying a succession of short magnetic field pulses oscillating at substantially nuclear Larmor frequency to said body of material to excite the nuclei thereof, said magnetic field pulses being applied at right angles to said unidirectional field and the intervals between pulses having a time duration not exceeding the relaxation time of said nuclei, means oriented with respect to said body of material in a first direction for deriving a first induced current from said nuclei during the intervals between magnetic field pulses, means oriented with respect to said body of material in a second direction at a right angle to said first direction for deriving a second induced current from said nuclei during the intervals between magnetic field pulses, means for deriving a first signal from said first induced current which is proportional to the departure in frequency of said induced current from the nuclear Larmor frequency, means operated by said first signal for positioning a platform carrying said body of material in one selected direction, means for deriving a second signal from said first induced current which is proportional to the time integral of said first induced current, means for deriving a third signal from said second induced current which is proportional to the time integral of said second induced current, and means operated by said second and third signals for positioning said platform in two selected directions at right angles to said one selected direction and to each other.

2. A direction sensor comprising, material containing nuclei of atoms, one kind of said nuclei having a magneto gyric ratio $\gamma$, means constantly applying a unidirectional homogeneous magnetic field of a selected strength H to said material in a first direction, a coil positioned adjacent to said material having its axis in a second direction through said material at a right angle to said first direction, an alternating current generator having an output frequency substantially equal to $\gamma H$, means applying said generator output in discrete pulses to said coil whereby said material is subjected to pulses of alternating magnetic field, means connected to said coil for detecting current therein between said pulse times induced by nuclear relaxation, means connected to said detecting means for measuring the frequency and phase of said induced current and means for deriving from said frequency and phase measurement an error signal representative of the sense and rate of rotation of said molecular direction sensor relative to the inertial frame in a selected plane of rotation.

3. A direction sensor comprising, material containing nuclei of atoms, one kind of said nuclei having an observable magnetic moment and a ratio $\gamma$ of magnetic moment to angular momentum, means constantly applying a unidirectional homogeneous magnetic field of a selected average strength H uniformly to all of said material in a first direction, a coil adjacent to said material having its axis directed in a second direction extending through said material at a right angle to said first direction, an oscillator having a frequency of oscillation of substantially $\gamma H$, means for deriving a pulse signal from the output of said oscillator, means for applying said pulse signal to said coil whereby the magnetic field thereof encompasses all of said material, said pulse signal having an amplitude and duration such that the precessional half-cone angle of said one kind of nuclei is brought to 90°, means connected to said coil for detecting therein the current induced subsequent to said pulse by nuclear relaxation, means connected to said detecting means for measuring the phase of said induced current relative to the phase which it would have if said material were stabilized in the inertial frame, and means integrating said relative phase to secure therefrom a measure of the direction of orientation of said material in the inertial frame.

4. A direction sensor comprising, material containing nuclei of atoms, one kind of said nuclei having a ratio $\gamma$ of magnetic moment to moment of momentum, means continuously applying a unidirectional homogeneous magnetic field of a selected constant average strength H to said material in a first direction, means for stabilizing said magnetic field first direction in the inertial frame, a coil adjacent to said material having its axis oriented in a second direction, said second direction comprehending the center of said material and being at a right angle with the direction of said magnetic field, an oscillator oscillating at a frequency substantially equal to $\gamma H$, means applying the output of said oscillator to said coil in discrete alternating current pulse signals having such duration and amplitude as to increase the precessional half-cone angle of said one kind of nuclei to 90°, means connected to said coil for measuring the frequency of current induced therein by relaxing nuclei of said one kind during the intervals between said pulse signals and means connected to said measuring means for indicating the orientation of said material relative to the inertial frame in a plane normal to said first direction.

5. A direction sensor comprising, a chemical substance containing nuclei of atoms and containing unpaired electrons capable of being excited by an alternating field of electron Larmor frequency and having a magneto gyric ration of $\gamma_e$, one kind of said nuclei having a magneto gyric ratio of $\gamma_n$, means continuously applying a unidirectional homogeneous magnetic field of a selected strength H to said chemical substance in a first direction, means stabilizing said first direction in the inertial frame, field-producing means for producing an alternating magnetic field through said chemical substance, said alternating magnetic field having an axis oriented in a second direction extending through said chemical substance at a right angle with respect to the direction of said unidirectional magnetic field, a constant-frequency oscillator oscillating at the frequency of $\gamma_e H$, means exciting said field-producing means by said oscillator, a coil adjacent to said chemical substance having its axis oriented in a third direction directed through said chemical substance at right angles to both the magnetic axis direction of said field-producing means and of said unidirectional magnetic field, a second constant-frequency oscillator oscillating at substantially the frequency of $\gamma_n H + \omega$, in which $\omega$ is the rotation of the molecular direction sensor relative to the inertial frame in a plane normal to said first direction, means applying the output of said second oscillator to said coil in the form of alternating current pulses having such duration and amplitude as to increase the precessional half-cone angle of said one kind of nuclei to 90°, means connected to said coil for measuring the frequency of current induced in the coil by relaxing nuclei of said one kind during the interval between said pulses, and means connected to said measuring means for stabilizing said chemical substance macroscopic rotation in a plane normal to said first direction.

6. A direction sensor in accordance with claim 5, in which said field-producing means is a coil.

7. A direction sensor comprising, a chemical substance containing unpaired electrons capable of being excited by an alternating magnetic field of electron Larmor frequency, said unpaired electrons having a magneto gyric ratio of $\gamma_e$, said chemical substance also containing nuclei of atoms, one kind of said nuclei having an observable magnetic moment and a magneto gyric ratio of $\gamma_n$, means constantly applying a unidirectional homogeneous magnetic field of a selected strength H uniformly to said entire chemical substance in a first direction, field-producing means producing an alternating magnetic field in said chemical substance, said alternating field having its axis oriented in a second direction through the chemical substance at a right angle to said first direction, an oscillator oscillating at the frequency $\gamma_e H$, a coil positioned adjacent to said chemical substance having its axis oriented in a third direction through the chemical substance and at right angles to both said first and second directions, means exciting said field-producing means by the output of said oscillator whereby excited electrons generate the Overhauser-enhanced signal effect in said coil, a second constant-frequency oscillator oscillating at susbtantially the frequency of $\gamma_n H$, means applying the output to said second oscillator to said coil in recurrent series of pulses of selected equal amplitudes and of selected durations, the duration of the first pulse of each series being one-half of the duration of all subsequent pulses of the series, the time intervals between said subsequent pulses of each series being equal, the time interval after said first pulse being one-half of the remaining time intervals, whereby the first pulse of said pulse series causes increase of the Larmor precessional half-cone angle of said one kind of nuclei to 90° and all other pulses of said series tend to increase said half-cone angle to 180°, said coil having induced therein energy of the nuclear precessional Larmor frequency between said pulses and during nuclear relaxation, said second oscillator including means for receiving the relaxation signals induced in said coil, means for producing coherence of all pulses generated by said second oscillator after said first pulse with said received signals, means connected to said coil for measuring the frequency of the current induced therein between pulses, and means for comparing said measured frequency with the frequency $\gamma_n H$ whereby the rotation of said chemical substance in a plane normal to said first direction is ascertained.

8. A direction sensor in accordance with claim 7 in which said field-producing means is a coil.

9. A direction sensor comprising, material containing nuclei and electrons of atoms, means applying a unidirectional magnetic field of selected strength H to said material in a first direction, a first coil surrounding said material having its axis in said first direction, a low frequency generator exciting said coil whereby said unidirectional magnetic field amplitude projected through said material is varied through excursions of a few percent of the magnetic field strength H, a second coil positioned adjacent to said material having its axis extending through said material in a second direction at a right angle to said first direction, an oscillator having the frequency $\gamma_e H$, in which $\gamma_e$ is the electron magneto gyric ratio, said oscillator being connected to excite said second coil, a receiver connected to said second coil, said receiver being adapted to receive energy having the frequency $\gamma_e H$, means deriving from said receiver and from said low frequency generator an error signal representing the departure of electron Larmor frequency from said oscillator frequency, means controlling said magnetic field-applying means in accordance with the amount and sense of said error signal whereby said magnetic field strength H is maintained at such strength that the electron Larmor frequency is maintained equal to said oscillator frequency, a third coil having its axis extending through said material in a third direction perpendicular to said first and second directions, a low frequency oscillator having a frequency substantially equal to $\gamma_n H$ in which $\gamma_n$ is the nuclear magneto gyric ratio, said low frequency oscillator output energizing said third coil in at least one pulse of selected amplitude and duration, means measuring the currents induced in said third coil by nuclei during their periods of relaxation, and means for deriving a signal from said last-named means, said signal indicating orientation of said material relative to the inertial frame in a plane normal to said first direction.

10. A direction sensor comprising, material containing nuclei and electrons, means applying a unidirectional magnetic field in a first direction through said material, means utilizing the Larmor precessional frequency of said electrons for maintaining the average value of said unidirectional magnetic field constant, a first coil positioned adjacent to said material and having its axis extending through the material in a second direction perpendicular to said first direction, oscillator means applying pulses to said first coil, said pulses having a carrier frequency substantially equal to $\omega_n$, the product of the strength of said magnetic field and the nuclear magneto gyric ratio, said pulses also having selected amplitudes and durations, means operative during the intervals between pulses for deriving currents from said first coil induced therein by relaxing nuclei, means measuring the difference between the frequency of said relaxation currents and the frequency $\omega_n$, the difference being a measure of the rotation of said material in the inertial frame in a plane perpendicular to said first direction, means measuring the amplitudes of said relaxation currents induced in said first coil, said amplitudes being measures of the rotation of said material in the inertial frame in a plane comprehending said first and second directions, a second coil positioned adjacent to said material having its axis extending through the material in a third direction perpendicular to both first and second directions, means operative during the intervals between pulses for deriving currents from said second coil induced therein by relaxing nuclei, and means measuring the amplitudes of said relaxation currents induced in said second coil, said amplitudes being measures of the rotation of said material in the inertial frame in a plane comprehending said first and third directions.

11. A direction sensor comprising, a material containing nuclei and electrons, means applying a unidirectional magnetic field in a first direction through said material, means utilizing the Larmor precessional frequency of said electrons for maintaining the average value of said unidirectional magnetic field constant, a first coil positioned adjacent to said material and having its axis extending through the material in a second direction perpendicular to said first direction, oscillator means applying pulses to said first coil, said pulses having a carrier frequency substantially equal to $\omega_n$, the product of the strength of said magnetic field and the nuclear magneto gyric ratio, said pulses also having selected amplitudes and durations, means operative during the intervals between pulses for deriving currents from said first coil induced therein by relaxing nuclei, means measuring the difference between the frequency of said relaxation currents and the frequency $\omega_n$, the difference being a measure of the rotation of said material in the inertial frame in a plane perpendicular to said first direction, means integrating said relaxation currents induced in said first coil, means comparing the resulting integral current with a reference datum current to form a first difference signal representing the rotation of said material in the inertial frame in a plane comprehending said first and second directions, a second coil positioned adjacent to said material having its axis extending through the material in a third direction perpendicular to both first and second directions, means operative during the intervals between pulses for deriving currents from said second coil induced therein by relaxing nuclei, means integrating said relaxation currents induced in the second coil, and means comparing the resulting integral current with a reference datum current to form a second difference signal representing the rotation of said material in the inertial frame in a plane perpendicular to said second direction.

12. A direction sensor in accordance with claim 11 including a servomechanism for maintaining said material non-rotating in the inertial frame in the plane perpendicular to said first direction, means controlling said servomechanism in accordance with said frequency difference, means for securing error signals from said first and second difference signals, and servomechanism means controlled thereby for maintaining said material non-rotating in the inertial frame in the planes perpendicular to said second and third directions.

13. A direction sensor comprising, a material containing nuclei and electrons, means applying a unidirectional magnetic field in a first direction through said material, means utilizing the Larmor precessional frequency of said electrons for maintaining the average value of said unidirectional magnetic field constant, a first coil positioned adjacent to said material and having its axis extending through the material in a second direction perpendicular to said first direction, oscillator means applying pulses to said first coil, said pulses having a carrier frequency substantially equal to $\omega_n$, the product of the strength of said magnetic field and the nuclear magneto gyric ratio, said pulses also having selected amplitudes and durations, means operative during the intervals between pulses for deriving currents from said first coil induced therein by relaxing nuclei, means measuring the difference between the frequency of said relaxation currents and the frequency $\omega_n$, the difference being a measure of the rotation of said material in the inertial frame in a plane perpendicular to said first direction, a second coil positioned adjacent to said material and having its axis extending through the material in a third direction, said third direction lying in a first plane comprehending said first and second directions, means for integrating the relaxation currents induced in said second coil by said relaxing nuclei, means comparing the resulting integral current with a reference datum current to form a first difference signal representing the rotation of said material in the inertial frame in said first plane, a third coil positioned adjacent to said material having its axis extending through the material in a fourth direction lying in a second plane perpendicular to said second direction, means operative during the intervals between pulses for deriving currents from said third coil induced therein by relaxing nuclei, means integrating said relaxation currents induced in the third coil, and means comparing the resulting integral current with a reference datum current to form a second difference signal representing the rotation of said material relative to the inertial frame in said second plane.

References Cited in the file of this patent

UNITED STATES PATENTS

| | | |
|---|---|---|
| Re. 23,769 | Varian | Jan. 12, 1954 |
| 2,720,625 | Leete | Oct. 11, 1955 |
| 2,841,760 | Hansen | July 1, 1958 |
| 2,894,199 | Kirchener | July 7, 1959 |

OTHER REFERENCES

Schwartz: The Review of Scientific Instruments, vol. 28, No. 10, October 1957, pp. 780 to 789.

Herzog et al.: Physical Review, vol. 103, No. 1, July 1956, pp. 148 to 166.

Buchta et al.: The Review of Scientific Instruments, vol. 29, No. 1, January 1958, pp. 55 to 60.

Blume: Physical Review, vol. 109, No. 6, March 1958, pp. 1867 to 1873.

Holcomb et al.: Physical Review, vol. 98, No. 4, May 1955, pp. 1074 to 1077 principally noted.